(12) United States Patent
Koivusaari et al.

(10) Patent No.: US 9,551,125 B2
(45) Date of Patent: Jan. 24, 2017

(54) METHOD FOR INSTALLING AND SERVICING AN APPARATUS RECOVERING THE KINETIC ENERGY OF WATER, AND AN APPARATUS RECOVERING THE KINETIC ENERGY OF WATER

(71) Applicant: AW-ENERGY OY, Vantaa (FI)

(72) Inventors: Rauno Koivusaari, Koria (FI); Yrjo Tuokkola, Helsinki (FI); Arvo Jarvinen, Vantaa (FI); John Liljelund, Helsinki (FI); Matti Vuorinen, Espoo (FI); Erkki Kasanen, Helsinki (FI); Jorma Savolainen, Inkoo (FI); Pekka Miettinen, Espoo (FI)

(73) Assignee: AW-ENERGY OY, Vantaa (FI)

( * ) Notice: Subject to any disclaimer, the term of this patent is extended or adjusted under 35 U.S.C. 154(b) by 492 days.

(21) Appl. No.: 14/061,299

(22) Filed: Oct. 23, 2013

(65) Prior Publication Data

US 2014/0050535 A1 Feb. 20, 2014

Related U.S. Application Data

(63) Continuation-in-part of application No. 12/411,785, filed on Mar. 26, 2009, now abandoned.

(51) Int. Cl.
*E02B 9/00* (2006.01)
*E02B 17/02* (2006.01)
*F03B 13/10* (2006.01)
*E02B 9/08* (2006.01)
*F03B 13/18* (2006.01)

(52) U.S. Cl.
CPC ............... *E02B 17/02* (2013.01); *E02B 9/08* (2013.01); *F03B 13/10* (2013.01); *F03B 13/182* (2013.01); *F05B 2240/97* (2013.01); *F05B 2260/02* (2013.01); *F05B 2260/40* (2013.01); *F05B 2260/406* (2013.01); *Y02E 10/38* (2013.01)

(58) Field of Classification Search
CPC .... B63G 8/22; E02B 17/02; E02B 2017/0039; E02B 9/00; E02B 9/08
USPC ..... 405/76, 205, 206, 207; 114/53, 125, 333
See application file for complete search history.

(56) References Cited

U.S. PATENT DOCUMENTS 2,551,375 A 5/1951 Hayward
3,220,372 A * 11/1965 Lehmann ............... B63B 35/28
114/321
3,309,879 A 3/1967 Miller
(Continued)

FOREIGN PATENT DOCUMENTS

WO WO 2004097212 A1 * 11/2004 ............ F03B 13/182

*Primary Examiner* — Frederick L Lagman
(74) *Attorney, Agent, or Firm* — Birch, Stewart, Kolasch & Birch, LLP (57) ABSTRACT

The object of the invention is a method for installing and servicing an apparatus module recovering the kinetic energy of water; and the apparatus module itself. The apparatus module with wave energy recovering units is descended into the sea bottom and is kept steady at the sea bottom by the help of its own mass and the mass of the water filled into a plurality of soft and hard compartments and valve compartments in the body of the apparatus module. Correspondingly the apparatus module is lifted into the surface of the water and made floating by the help of air that is blown to the plurality of soft and hard compartments and the valve compartments in order to replace the water.

16 Claims, 7 Drawing Sheets

(56) References Cited

U.S. PATENT DOCUMENTS

| | | | | |
|---|---|---|---|---|
| 3,589,133 A * | 6/1971 | Lowd | ................ | E21B 43/36 114/331 |
| 4,048,512 A | 9/1977 | Wood | | |
| 4,276,849 A * | 7/1981 | Bloxham | ................ | B63C 1/06 114/125 |
| 4,938,629 A * | 7/1990 | Boudrias | ................ | E02B 3/06 114/263 |
| 5,292,207 A * | 3/1994 | Scott | ................ | E02B 17/0021 405/207 |
| 5,938,374 A * | 8/1999 | Nakase | ................ | E02B 17/00 405/195.1 |
| 6,806,586 B2 | 10/2004 | Wobben | | |
| 7,044,685 B2 | 5/2006 | Wybro et al. | | |
| 7,131,269 B2 | 11/2006 | Koivusaari | | |
| 7,255,054 B1 * | 8/2007 | DiGregorio | ................ | B63G 8/001 114/256 |
| 7,470,086 B2 * | 12/2008 | Jennings | ................ | F03B 13/10 405/205 |
| 2004/0253060 A1 * | 12/2004 | Horton, III | ................ | B63B 1/107 405/205 |
| 2006/0233613 A1 * | 10/2006 | Welch, Jr. | ................ | E02B 9/08 405/76 |
| 2007/0108768 A1 * | 5/2007 | Dempster | ................ | F03B 17/063 290/42 |
| 2008/0106101 A1 | 5/2008 | North et al. | | |
| 2009/0162144 A1 * | 6/2009 | Ayre | ................ | E02B 9/08 405/76 |
| 2009/0297276 A1 * | 12/2009 | Foo | ................ | B63B 21/27 405/224 |
| 2013/0064608 A1 * | 3/2013 | Allton | ................ | E02B 9/08 405/207 |
| 2014/0023441 A1 * | 1/2014 | Smith | ................ | F03B 11/00 405/224 |
| 2014/0138954 A1 * | 5/2014 | Antonucci | ................ | F03B 17/061 290/54 |
| 2014/0145445 A1 * | 5/2014 | Richer | ................ | F03B 13/264 290/54 |

* cited by examiner

METHOD FOR INSTALLING AND SERVICING AN APPARATUS RECOVERING THE KINETIC ENERGY OF WATER, AND AN APPARATUS RECOVERING THE KINETIC ENERGY OF WATER

This application is a continuation-in-Part of co-pending application Ser. No. 12/411,785 filed on Mar. 26, 2009, and for which priority is claimed under 35 U.S.C. §120.

BACKGROUND OF THE INVENTION

The present invention relates to a method for installing and servicing an apparatus recovering the kinetic energy of water and an apparatus for recovering the kinetic energy of water.

The apparatus according to the invention is suited very well for instance for an apparatus for recovering wave energy or tidal energy of seawater. The recovered energy is further converted for instance to electric energy and/or fresh water. In the following only the apparatus for recovering wave energy is dealt with a more precise way.

In the wave energy recovery solutions according to the prior art each recovery unit is usually situated separately on its own base on the bottom of the water basin, such as the bottom of sea. The base for each recovery unit has been made ready on the sea bottom before the installation of the recovery unit. The manufacture of that kind of the base at the sea bottom is slow, requires a lot of preparations, contains a lot of expensive diving labor, and needs a lot of various fixtures. In addition in order to install the recovery unit onto the said base heavy vessel and crane fixtures are required. However, that kind of heavy fixtures is usually not easily available for just the time it is needed. For that reason the prior art solutions suffer from extensive installation costs and a slow installation work. In addition one problem is the inconvenience involved with the maintenance or servicing. The maintenance work requires also a lot of preparation work and heavy vessel and crane fixtures in order to lift the recovery unit onto the surface of the water and to perform the service needed. Also after the service works the same heavy fixtures are needed again. This is slow and makes the service works very expensive.

SUMMARY OF THE INVENTION

An object of the present invention is to eliminate the drawbacks described above and to achieve an inexpensive, easy and a fast method for installing and servicing an apparatus recovering the kinetic energy of water. Likewise the object of the present invention is to achieve an apparatus for recovering the kinetic energy of water.

According to one embodiment of the present invention, a method for installing and servicing an apparatus recovering the kinetic energy of water is disclosed, in which method the apparatus is installed at the bottom of a water basin, such as a sea, the method comprising at least the following steps: creating an apparatus module comprising at least a floating body equipped with a plurality of hard compartments enduring higher pressure and a plurality of soft compartments enduring lower pressure than the hard compartments, wherein said compartments to be filled with gas, such as air, and with water; and two or more recovery units for recovering kinetic energy of water, the recovery units being attached to the body; transporting the apparatus module to its production site; and descending the apparatus module onto the bottom of the water basin by allowing the water run at first into the soft compartments starting at the first end of the apparatus module, and after essentially all the soft compartments are filled with water, allowing the water run into the hard compartments starting at the first end of the apparatus module so that the body descends onto the bottom of a water basin the first end ahead and draws at the same time the recovery units into their production site.

According to another embodiment of the present invention an apparatus for recovering the kinetic energy of water is disclosed, which apparatus is installed at the bottom of a water basin, such as a sea, the apparatus comprising at least as a base acting body equipped with a plurality of hard compartments enduring higher pressure and a plurality of soft compartments enduring lower pressure than the hard compartments, wherein all the compartments to be filled with gas, such as air, and with water; and two or more recovery units for recovering kinetic energy of water, the recovery units being attached to the body forming an apparatus module.

According to an aspect of the present invention, the solution of the invention has the advantage that by using the solution for instance the apparatus for recovering wave energy of seawater can be installed and serviced more easily, faster and with smaller costs than with solutions according to prior art. Hard compartments that may be used are pressure vessels and relatively costly but using soft compartments in addition to hard compartments the costs can be reduced because the manufacturing and material costs of the soft compartments are much smaller than those of hard compartments. In the solution according to the invention the heavy vessels with big cranes are not needed, but the apparatus can be installed and lifted for servicing or repairing by the help of small fixtures, for example by the help of a small trawler. Likewise the preparation work for the installation and servicing or repairing is much faster and easier in the solution according to the invention.

One advantage is also the fact that in easy cases the servicing or repairing can be made at sea, only by lifting the apparatus onto the surface of the water and making the work on the surface. The lifting of the apparatus takes only about one hour. After the servicing or repairing the apparatus is descended back onto to the sea bottom.

In addition one advantage is that because the body of the apparatus is made of concrete it does not rust. One advantage is also the fact that a heavy concrete body protects the components of the apparatus from water and external elements of danger. A further advantage is that thanks to the modular structure separate apparatuses are easy to couple together for a big power plant, and the servicing can be made for instance so that a new or newly serviced apparatus module is brought to the production site at the sea and the old one is replaced with the new one and is towed to the dockyard for servicing or repairing. The exchange of the apparatus module is fast to do and does not require heavy fixtures. One more advantage is that it is easy to integrate various measuring instruments into the body of the apparatus module.

Further scope of applicability of the present invention will become apparent from the detailed description given hereinafter. However, it should be understood that the detailed description and specific examples, while indicating preferred embodiments of the subject matter described in this specification, are given by way of illustration only, since various changes and modifications within the spirit and scope of the subject matter described in this specification will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus, are not limitative of the present invention. Like reference numbers and designations in the various drawings indicate like elements.

DETAILED DESCRIPTION OF THE INVENTION

The following detailed description refers to the accompanying drawings. The same reference numbers in different drawings identify the same or similar elements. Also, in the following detailed description, for purposes of explanation, numerous specific details are set forth in order to provide a thorough understanding of the claimed subject matter. The following detailed description does not limit the concepts discussed. Instead, the scope of the concepts discussed by the appended claims and equivalents thereof.

Figure 1:
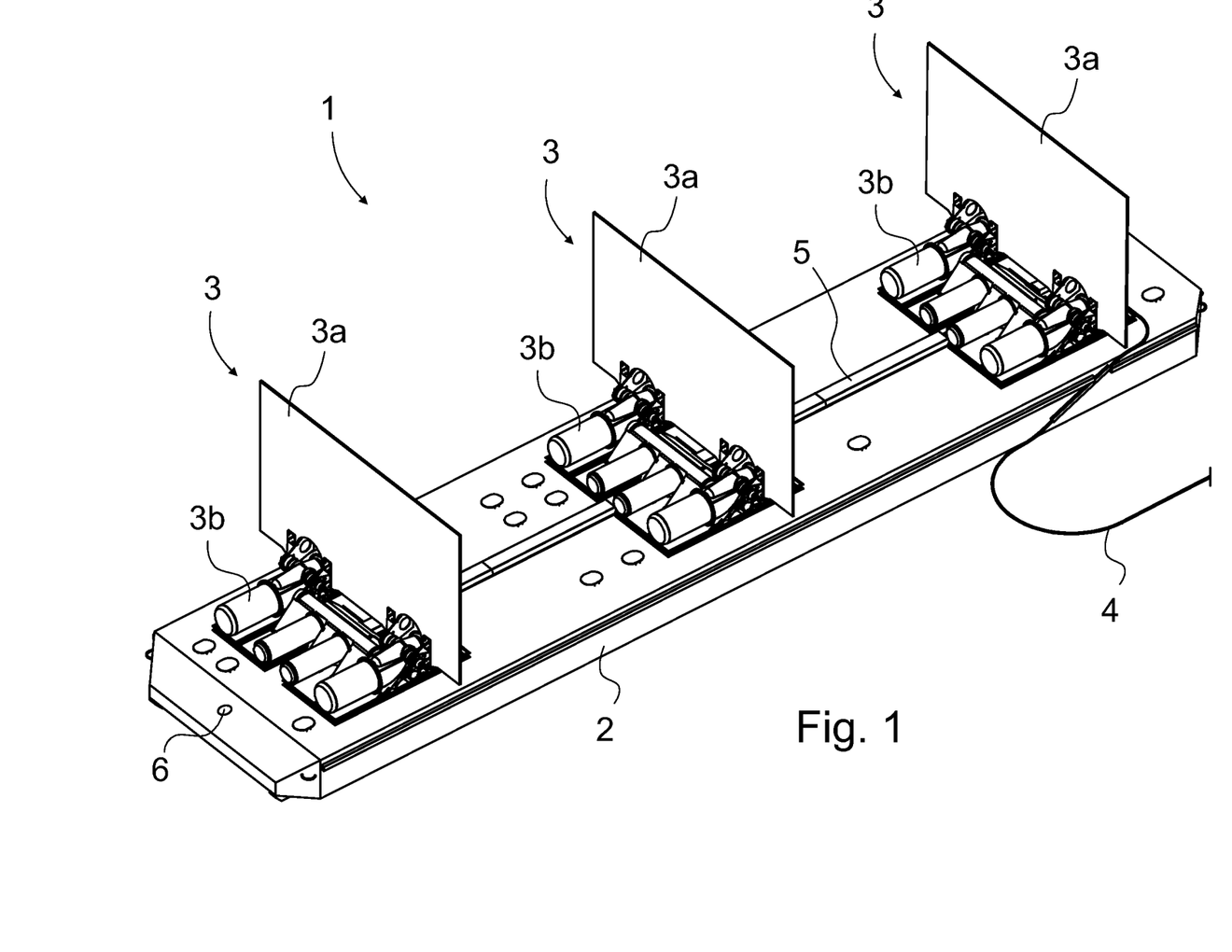
FIG. 1 presents an apparatus module according to an embodiment of the invention seen obliquely in top view.

FIG. 1 presents an apparatus module 1 according to the invention for recovering kinetic energy of seawater. The apparatus module 1 according to the example is situated in a so-called intermediate water area of the water basin, and is capable to recover kinetic energy of the waves of the sea and convert the kinetic energy into electric energy. Likewise the apparatus module 1 is capable to make fresh water from the seawater.

The apparatus module 1 comprises at least a body 2 that functions as a base, two or more onto the body 2 attached recovery units 3 for recovering wave energy, collecting means 3c (shown in FIG. 3) for collecting the energy recovered by the recovery units 3, a cable 4 for transferring the collected energy to further use, and a cable trough 5 equipped with a protective cover for joining all the recovery units 3 of the apparatus module 1 at least into the collecting means 3c.

Each recovery unit 3 comprises at least a plate like wing element 3a that is hinged at its lower edge onto the body 2 of the apparatus module 1, and the recovering means 3b of the wave energy. The wing element 3a is arranged to make reciprocating motion caused by the kinetic energy of the waves, and the recovered energy is either saved into the energy storages situated in the body 2 or transferred through the collecting means 3c and cable 4 to the use of the next unit that can be for instance a collecting station situated on shore. The fresh water produced by the apparatus module 1 can be stored in containers situated in the body 2 of the apparatus module 1, and delivered time to time for further use.

Figure 2:
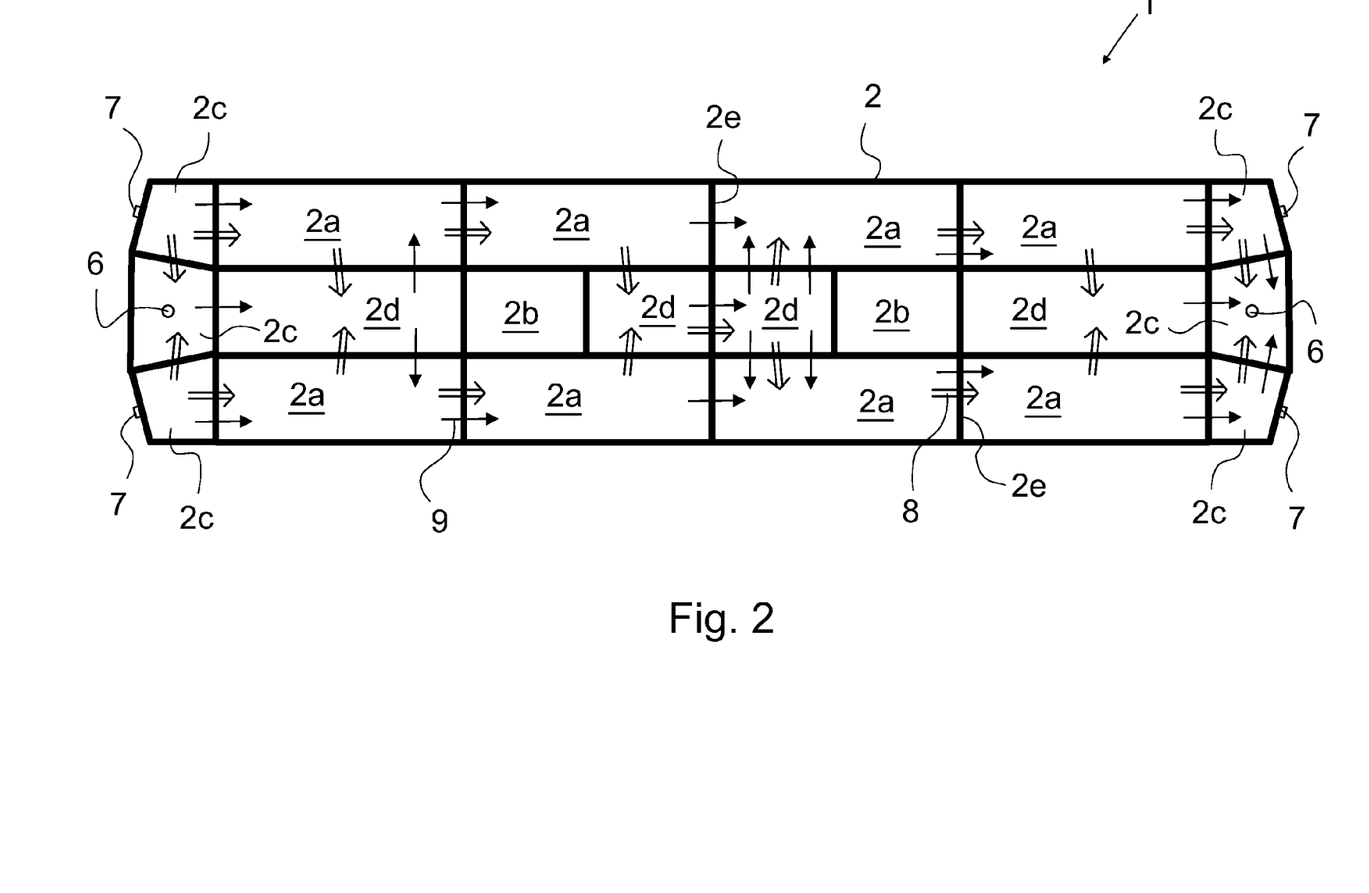
FIG. 2 presents diagrammatically and simplified a body of an apparatus module according to an embodiment of the invention the cover removed and seen in top view.

FIG. 2 presents the body 2 of the apparatus module 1 according to the invention seen in top view. In the figure the cover of the body 2 has been removed. The body 2 is made of concrete. It is either assembled of prefabricated cavity slabs or made by casting. The body 2 is comprised of a group of floating compartments 2a, 2d that are arranged one after the other in three parallel rows. The floating compartments 2a are stronger, so-called hard compartments that stand a higher pressure, for example at least about a pressure of 3 Bars and are situated in a longitudinal direction essentially on both sides of the body 2, whereas the compartments 2d are weaker, so-called soft compartments that stand only a lower pressure, for example a pressure of about 1, 2 Bars and are situated in a longitudinal direction essentially in the middle of the body 2. The hard compartments 2a are essentially mutually one after the other in the same row and likewise the soft compartments 2d are essentially mutually one after the other in the same row, though there may be other compartments between the soft compartments 2d in the same row. The embodiment of FIG. 2 comprises two rows of hard compartments 2a and one row of soft compartments 2d but the number of rows can also be different. For example there can be also two rows of soft compartments 2d as is presented later diagrammatically in FIG. 4a.

The body 2 has also instrument and machinery chambers 2b that are kept dry, and valve compartments 2c at both ends of the body 2. In the valve compartments 2c there are filling and discharge valves 6 for air and filling and discharge valves 7 for water. Upper pipes 8 for water filling and air discharging, and lower pipes 9 for air filling and water discharging have been installed to go through the separation walls 2e of the compartments 2a, 2c and 2d in order to allow water and air to run into all the floating compartments 2a, 2d and valve compartments 2c. In addition the ends of the body 2 have been reinforced in order to stand the body 2 hitting the sea bottom 12 when the apparatus module 1 is descended into the bottom of the water basin. Thanks to its heavy concrete structure the apparatus module 1 remains steady on the sea bottom 12 when the floating compartments 2a, 2d are filled with water. Correspondingly floating compartments 2a, 2d are big enough to allow the body 2 to float on the surface of the water when the floating compartments 2a, 2d are filled with air.

Figure 3:
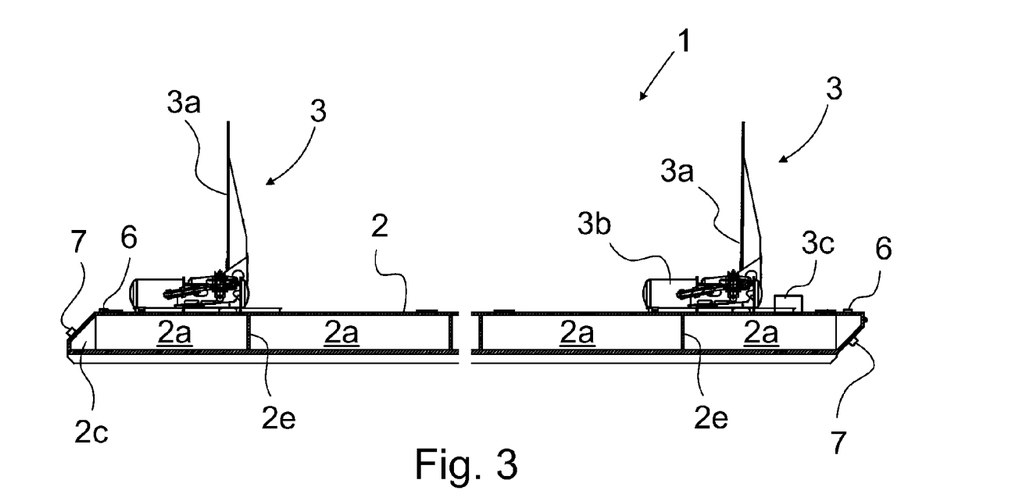
FIG. 3 presents diagrammatically and simplified an apparatus module according to an embodiment of the invention seen in side view and in a lengthwise intersection, and cut in the middle.
Figure 4:
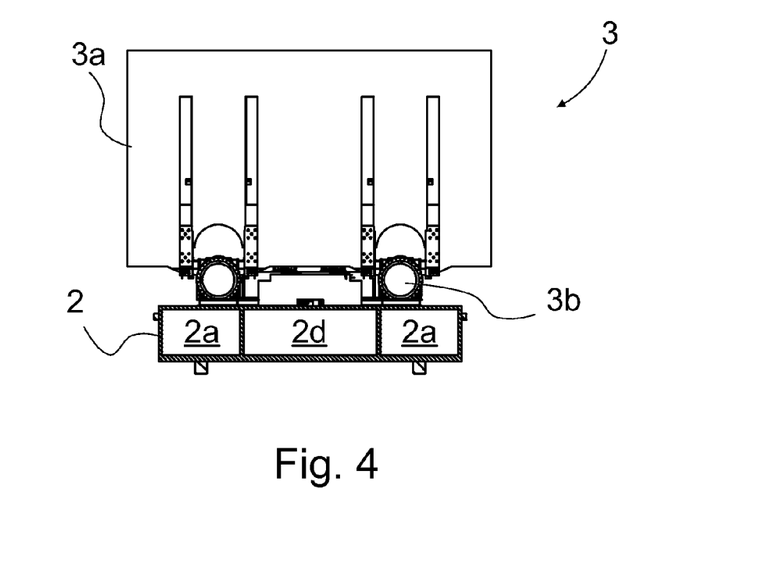
FIG. 4 presents diagrammatically and simplified an apparatus module according to an embodiment of the invention seen from the end and in a cross section.

In FIGS. 3 and 4 the apparatus according to the invention is shown separately from its neighborhood. In FIG. 3 the apparatus is shown in a lengthwise intersection along the line A-A in FIG. 2, and cut in the middle so that only two recovery units 3 are seen. The filling and discharge valves 6 for air and the filling and discharge valves 7 for water are seen at the both ends of the body 2. In FIG. 4 the apparatus according to the invention is shown in a cross section.

Figure 4A:
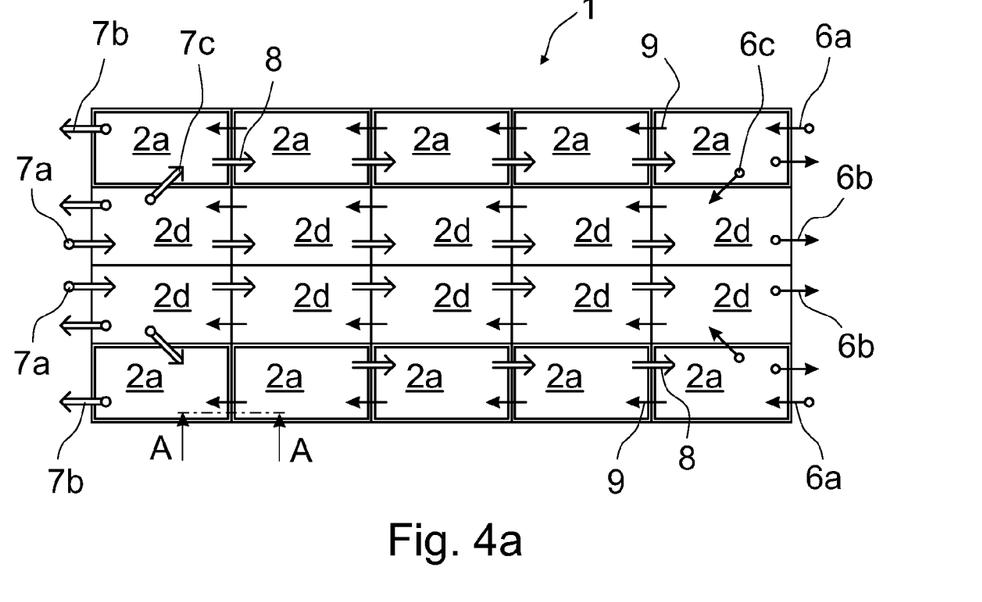
FIG. 4a presents diagrammatically and simplified a body of an apparatus module according to another embodiment of the invention the cover removed and seen in top view.

FIG. 4a presents diagrammatically and simplified a body 2 of an apparatus module according to another embodiment of the invention the cover removed and seen in top view. In this embodiment there one row of hard compartments 2a on each longitudinal side of the body 2 and two parallel rows of soft compartments 2d in the middle of the body between the rows of the hard compartments 2a. There are also other compartments as explained above but they are not presented in this diagrammatic figure. Unlike the body 2 in FIG. 2-4 the body in FIG. 4a comprises separate filling valves 7a and discharge valves 7b for water at the first end of the apparatus module 1, and separate filling valves 6a and discharge valves 6b for air at the second end of the apparatus module 1. In addition there is an internal filling valve 7c for water between the first soft compartments 2d and the first hard compartments 2a at the first end of the apparatus module 1, and an internal filling valve 6c for air between the first soft compartments 2d and the first hard compartments 2a at the second end of the apparatus module 1. The valve arrangement can, however, also be different. For example, the internal filling valves 6c, 7c can also be replaced by additional filling valves 6a, 7a at the ends of the apparatus module 1. Then, for example every row of the floating compartments 2a, 2d can have its own filling valve 6a for air and own filling valve 7a for water.

Figure 4B:
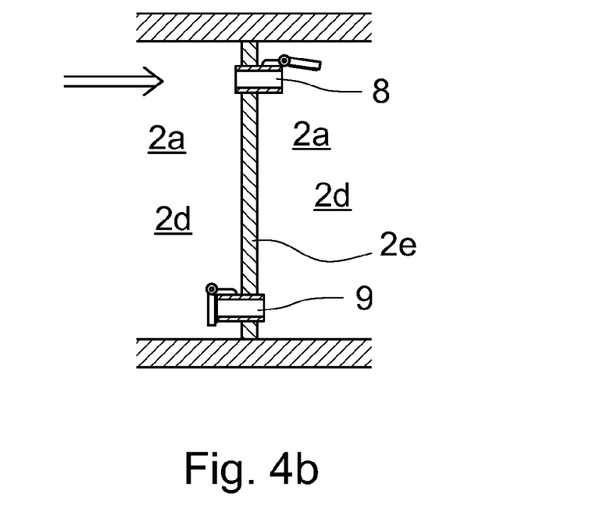
FIG. 4b presents diagrammatically and simplified a cross section A-A of hard floating compartments of the body of an apparatus module according to the invention seen in side view.

FIG. 4b presents diagrammatically and simplified a cross section B-B of hard floating compartments 2a of the body 2 of the apparatus module 1 according to the invention seen in side view. The cross section of the soft compartments 2d of the body 2 in side view is essentially similar to the cross section B-B of hard compartments 2a, and therefore reference numbers 2d are also included in FIG. 4b. The upper pipes 8 and lower pipes 9 can be equipped with a back-pressure valve to allow the water or air to flow only to one direction when filling and to another direction when discharging. The upper pipes 8 are near the ceiling of the compartments 2a, 2d and the lower pipes 9 are near the bottom of the compartments 2a, 2d.

FIGS. 5-10 show the steps of the method according to the invention for installing the apparatus module 1 recovering kinetic energy from the seawater into its production site, and for lifting the apparatus module 1 back onto the surface of the water for instance for servicing or repairing.

The apparatus module 1 according to the invention is intended to be descended into its production site onto the sea bottom 12 at the area situated in a so-called intermediate water area of the water basin. The intermediate water area refers here to the same area as in the WO publication No. WO2004097212, i.e. to the water basin area, generally ocean area in the depth range of the so-called breaker-line and shallow waters, extending to the wavelength of 0.5. In the intermediate water area the relation of the water depth to the principally prevailing wavelengths is between 1/2-1/20.

Figure 5:
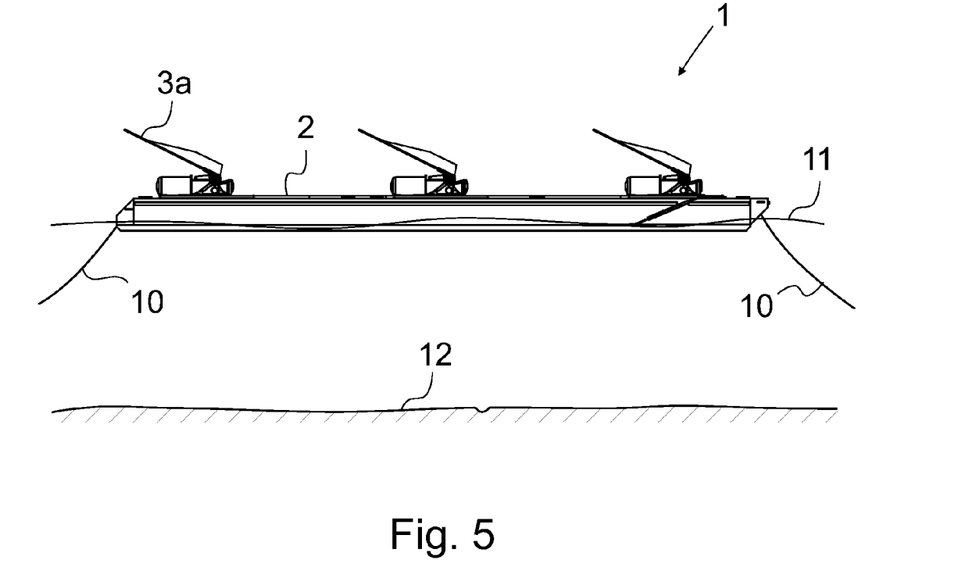
FIG. 5 presents an apparatus module according to an embodiment of the invention seen in side view at the beginning of an installation phase.

At the beginning of the installation the apparatus module 1 pre-assembled in the dockyard or onshore is towed floating and the wing elements 3a of the recovery units 3 turned down to a transporting position to the installation site that is marked with buoys that support the free ends of the anchor chains 10 that are anchored at the sea bottom 12. The towing can be done with a small trawler or boat. There are for instance one or two anchor chains 10 for each end of the apparatus module 1.

When the apparatus module 1 is floating above its production site it is fastened with its both ends into the free ends of the anchor chains 10 and the chains 10 are tightened. The descending of the apparatus module 1 from the surface 11 onto the sea bottom 12 can be done in many various ways, but the main idea is to keep the apparatus module 1 steady at the sea bottom 12 by the help of its own mass and the mass of the water filled into the compartments 2a, 2c and 2d, and making the apparatus module 1 floating by the help of gas, such like air that is blown to the compartments 2a, 2c and 2d to replace the water.

One way to descend the apparatus module 1 onto the sea bottom 12 is to open the filling valves 7, 7a for water and to stretch the apparatus module 1 towards the sea bottom 12 with the anchor chains 10. During the stretching water runs into the compartments 2a, 2c and 2d, and the apparatus module 1 begins to descend more and more easily towards the sea bottom 12.

Figure 6:
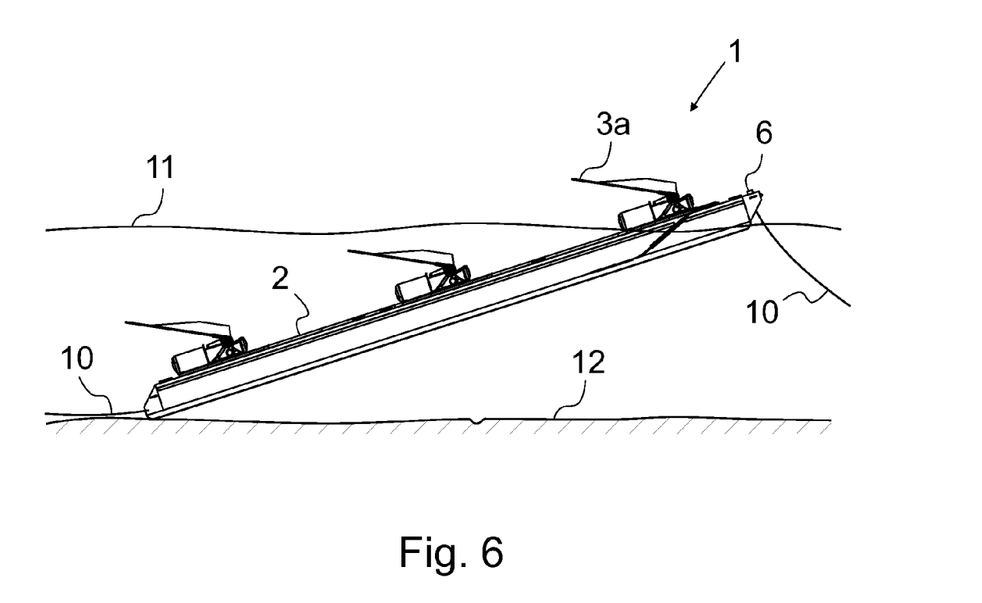
FIG. 6 presents an apparatus module according to FIG. 5 seen in side view during the installation phase.

Another way is shown in FIG. 6. Here the method is conducted so that at the beginning the filling valves 7 or 7a for water at the first end of the apparatus module 1 are opened, and the soft compartments 2d of the body 2 are allowed to be filled with water starting from the first end of the apparatus module 1. The filling of the soft compartments 2d is continued until all the soft compartments 2d one after the other are filled with water. During the water filling phase the first soft compartments 2d at the first end of the body 2 are filled first with water. When the first soft compartments 2d are essentially full of water, and the water level reaches the upper pipes 8 near the ceiling of the first soft compartments 2d the filling water begins to flow through the upper pipes 8 to the next soft compartments 2d in each row of soft compartments 2d. The filling of water continues in this way until all the soft compartments 2d are full of water. The total volumes of the soft compartments 2d and the hard compartments 2a are arranged so that the apparatus module 1 is still floating when the soft compartments 2d are full of water and the hard compartments 2a are full of air.

Figure 7:
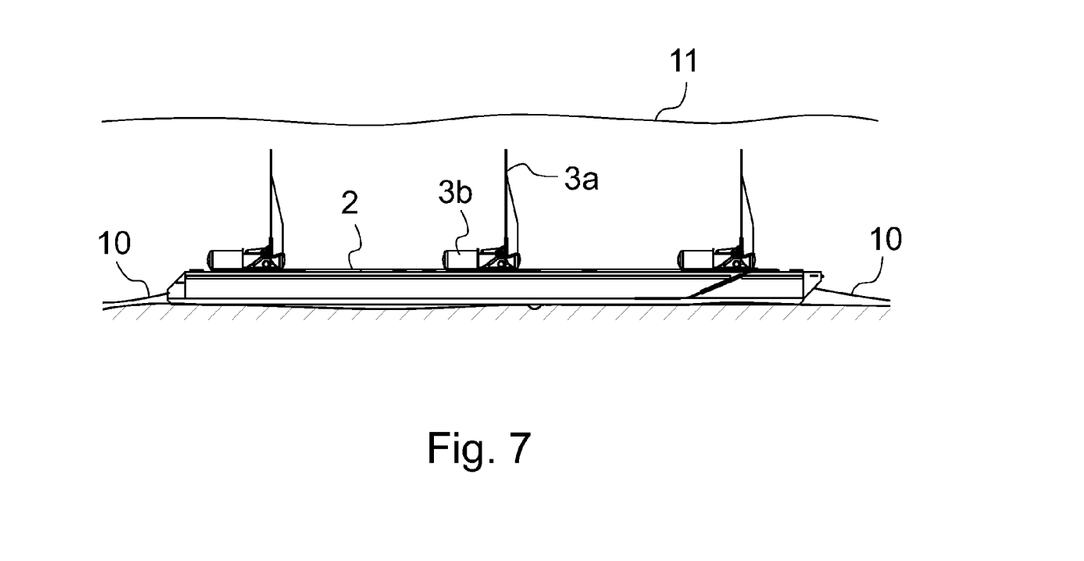
FIG. 7 presents an apparatus module according to FIG. 5 seen in side view installed on the bottom of the water basin.

When the soft compartments 2d are full of water and the apparatus module 1 is still floating the filling of hard compartments 2a with water can begin. The filling of the hard compartments 2a is essentially similar to the filling of the soft compartments 2d. The filling can be performed with an external filling valve 7 or 7a similar to the filling valve 7a of the soft compartments 2d, or like shown in FIG. 4a with an internal filling valve 7c between the first soft compartments 2d and the first hard compartments 2a. The internal filling valves 7c can be automatic and arranged to open when a pressure grows sufficiently high, or the internal filling valves 7c likewise the external filling and discharge valves 7, 7a, 7b can be manually operated either directly so that the a diver opens and closes them manually or they can be operated with a remote control. When the first hard compartments 2a begin to fill with water the first end of the apparatus module 1 begins to descent slowly onto the sea bottom 12 as is shown in FIG. 6, and when about a half of the hard compartments 2a are full of water the first end reaches the sea bottom 12. When all the hard compartments 2a of the apparatus module 1 are filled with water the apparatus module 1 descends completely onto the sea bottom 12 as is shown in FIG. 7. The hard compartment 2a stands the water pressure and therefore it does not collapse in the water though it still has air inside it. That is why the second end of the body does not crash into the sea bottom 12 but descends slowly and controlled onto the sea bottom 12. At the sea bottom 12 the rest of the hard compartments 2a at the second end of the body 2 are allowed to be filled with water in order to achieve a sufficient gravitation to keep the apparatus module 1 at the sea bottom 12.

At the same time when starting to fill the compartments 2a, 2d with water the filling and discharge valves 6 or discharge valves 6b for air are opened at the second end of the apparatus module 1 in order to allow the air come out from the compartments 2a, 2c and 2d. The anchor chains 10 are used to guide the apparatus module 1 to descend precisely onto its production location. When the apparatus module 1 is at its location at the sea bottom 12, and when essentially all the air has left the compartments 2a, 2c and 2d, all valves 6, 6b, 7 and 7a are closed and the apparatus module 1 is fastened steadily at its production site by the aid of the anchor chains 10.

Figure 8:
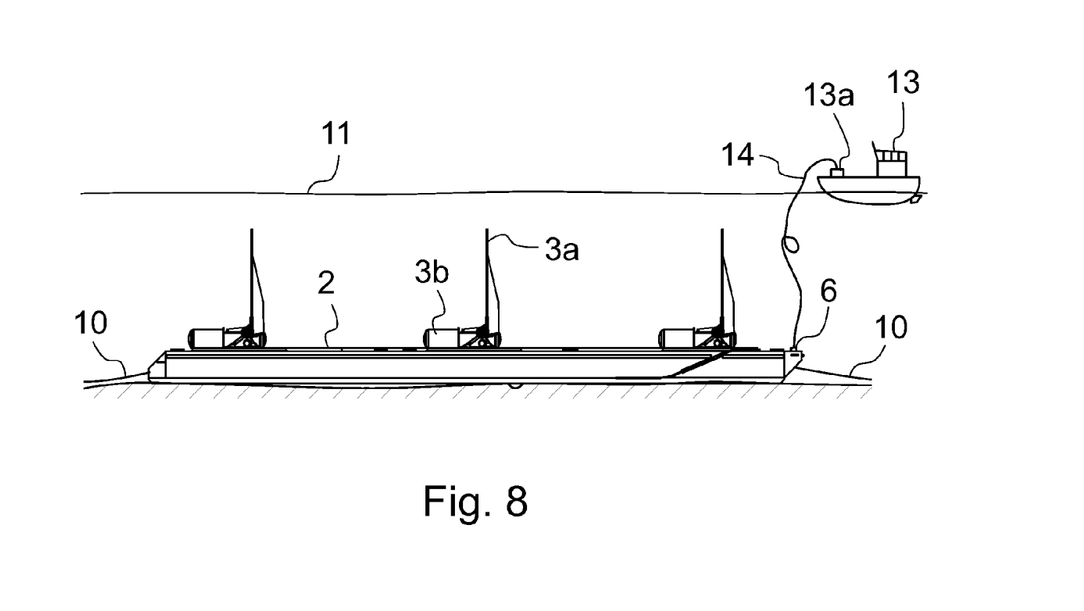
FIG. 8 presents an apparatus module according to FIG. 5 seen in side view on the bottom of the water basin and at the beginning of the lifting phase.

FIG. 8 shows the initial phase of the lifting of the apparatus module 1. At the beginning of the lifting phase the wing elements 3a of the recovery units 3 are turned down to their transporting position and a compressor 13a situated in the trawler 13 is coupled by the help of an air hose 14 into the filling and discharge valve 6 or the filling valve 6a for air located at the second end of the apparatus module 1. At the same time the filling and discharge valve 7 or discharge valve 7b for air located at the first end of the apparatus module 1 are opened in order to allow the water come out from the compartments 2a, 2c and 2d. The air filling is started at the second end of the body 2 and air is filled at first into the hard compartments 2a of the body 2, one after the other in the same row and in all rows until about a half of each row of hard compartments 2a are filled with air, and the second end begins to lift upwards. Because the apparatus module 1 is at the sea bottom 12 the air pressure has to be higher than on the surface of water in order to push the water out of the hard compartments 2a. Usually the air pressure of about 2 Bars, i.e. overpressure of 1 Bar is sufficient for that purpose. Because the hard compartments 2a stand the overpressure mentioned they keep they forms and do not expand or balloon during the lifting, and therefore they do not cause additional buoyancy. That makes it possible that the lifting end does not crash into the surface but lifts slowly towards the surface.

Figure 9:
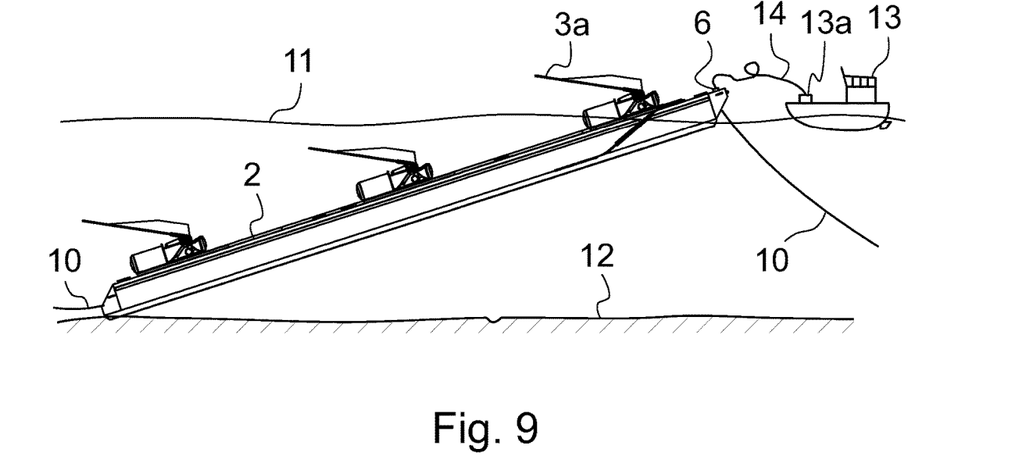
FIG. 9 presents an apparatus module according to FIG. 5 seen in side view during the lifting phase.

When the second end of the apparatus module 1 has ascended onto the surface the rest of the hard compartments 2a are filled with air until all the hard compartments 2a are filled with air, and also the first end of the apparatus module 1 ascends into the vicinity of the surface. Because the filling of the hard compartments 2a has been started at the sea bottom 12 the hard compartments 2a contain still overpressurized air when the apparatus module 1 is floating in the vicinity of the surface. That overpressurized air can be now led to the soft compartments 2d for example through the internal filling valves 6c for air between the first soft compartments 2d and the first hard compartments 2a at the second end of the apparatus module 1. There may be also other internal filling valves 6c for air between the soft compartments 2d and the hard compartments 2a in some other places of the body 2. The soft compartments 2d can also be filled with air through the external filling valves 6 or 6a for air but only when the apparatus module 1 is floating in the vicinity of the surface. The internal filling valves 6c can be automatic and arranged to open when the air pressure grows sufficiently high, or the internal filling valves 6c, likewise the external filling and discharge valves 6, 6a, 6b can be manually operated either directly so that the a diver opens and closes them manually or they can be operated with a remote control.

Figure 10:
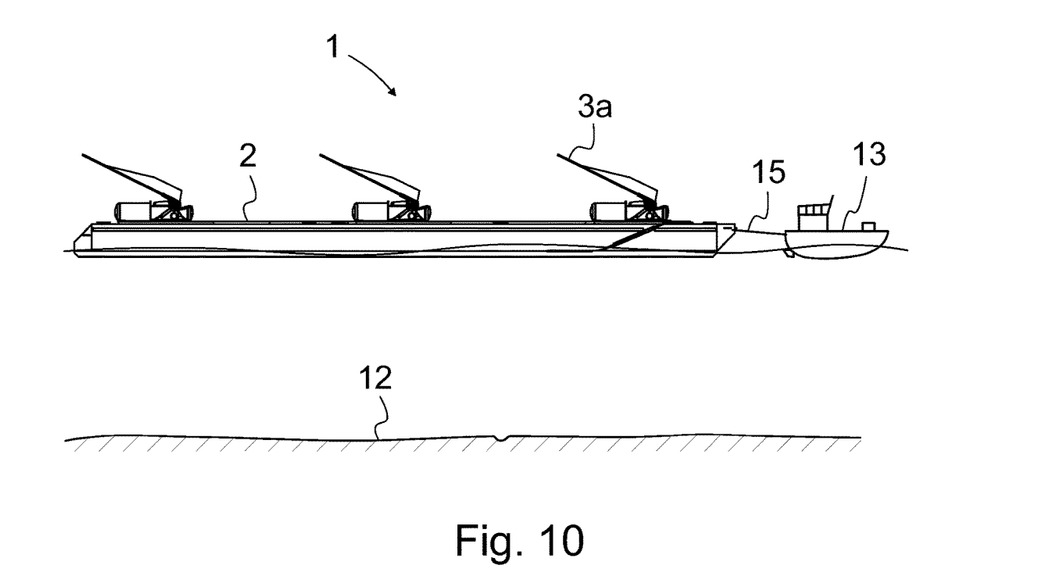
FIG. 10 presents an apparatus module according to FIG. 5 seen in side view after the lifting and ready for towing.

When the body 2 is totally on the surface and is floating the open valves 6 or 6a and 7 or 7b are closed and the apparatus module 1 is released from the anchor chains 10, the free ends of which are equipped with buoys as marks. After that the towing rope 15 can be coupled to the body 2 and the apparatus module 1 is towed with a trawler 13 to the dockyard for servicing as shown in FIG. 10.

Alternatively the servicing can be made also on the production site when the body 2 is floating on the surface of the water, if the tasks required make it possible. In addition it can be done so that when the trawler 13 comes to fetch the apparatus module 1 for servicing it brings at the same time a new or a newly serviced apparatus module 1 that is installed to replace the apparatus module 1 that has been lifted up for the service or repairing. In this way the operation of the wave energy power plant comprised of a plurality of apparatus modules 1 suffers extremely little during the service break of an apparatus module 1.

It is obvious to the person skilled in the art that the invention is not restricted to the example described above but that it may be varied within the scope of the claims presented below. Thus, for example, the method according to the invention can have steps that differ from the steps mentioned above, or the steps can be in a different order.

It is also obvious to the person skilled in the art that the apparatus module can differ from the apparatus module described above. The apparatus module may have a different number of wave energy recovery units than is presented in the example above. For instance the number of wave energy recovery units can be 2, 4, 5 or 6 or even more.

In addition it is obvious to the person skilled in the art that the apparatus module can be also made for recovering tidal energy, and the apparatus module can be sunk also into a deeper water than a so called intermediate water.

The invention claimed is:

1. A method for installing and servicing a kinetic energy recovery apparatus recovering the kinetic energy of water, in which method the apparatus is installed at the bottom of a water basin, such as a sea, the method comprising at least the following steps:
   creating an apparatus module comprising at least a floating body equipped with a plurality of hard compartments enduring higher pressure and a plurality of soft compartments enduring lower pressure than the hard compartments, wherein said compartments to be filled with gas, such as air, and with water; and two or more recovery units for recovering kinetic energy of water, the recovery units being attached to the body;
   transporting the apparatus module to its production site; and
   descending the apparatus module onto the bottom of the water basin by allowing the water to run at first into the soft compartments starting at a first end of the apparatus module, and after essentially all the soft compartments are filled with water, allowing the water to run into the hard compartments starting at the first end of the apparatus module so that the body descends onto the bottom of a water basin with the first end ahead and draws at the same time the recovery units into their production position.

2. The method as defined in claim 1, further comprising the steps where the service and/or repairing of recovery units is fulfilled so that the body with the recovery units is lifted up to the surface of the water, and if possible the service and/or repairing tasks are made on the production site on the surface of the water, or the apparatus module is transported to a dockyard or a corresponding site and the service and/or repairing tasks are made there.

3. The method as defined in claim 2, further comprising at least a step where the body with the recovery units is lifted up to surface of the water by pumping gas, such as air at least into the soft and hard compartments of the body.

4. The method as defined in claim 3, further comprising at least a step where gas, such as air is pumped into the body starting with the hard compartments at a second end of the body, opposite the first end, to lift the second end of the body first up to the vicinity of the surface of the water, and a step where gas, such as air is led into the soft compartments starting at the second end of the body to make the apparatus module float on the surface of the water.

5. The method as defined in claim 3, further comprising at least a step where gas, such as air is led from the hard compartments into the soft compartments when the apparatus module is floating in the vicinity of the surface of the water.

6. The method of claim 1 wherein the step of descending descends the apparatus module into its production site in the intermediate water basin depth where the relation of the water depth to the principally prevailing wavelengths is between 1/2-1/20.

7. An apparatus for recovering the kinetic energy of water, which apparatus is installed at the bottom of a water basin, such as a sea, the apparatus comprising:
at least as a base, an acting body;
a plurality of hard compartments provided with the acting body and enduring higher pressure;
a plurality of soft compartments provided with the acting body and enduring lower pressure than the hard compartments,
wherein all of the compartments are configured to be filled with gas, such as air, and with water; and
two or more recovery units for recovering kinetic energy of water, the recovery units being attached to the body forming an apparatus module.

8. The apparatus according to claim 7, further comprising:
at least first filling and discharge valves or first filling valves for gas, such as air; and
second filling and discharge valves or second filling valves for water through the second filling and discharge valves or second filling valves water is filled into the soft and hard compartments of the body for descending the body together with the recovery units onto the bottom of the water basin; and
through the first filling and discharge valves or first filling valves gas, such as air is filled into the compartments of the body for lifting the body together with the recovery units into the surface of the water.

9. The apparatus according to claim 7, where the first filling and discharge valves for gas, such as air and the filling and the second discharge valves for water are located at both opposing ends of the body, whereas the first filling valves and discharge valves for air are located at a second end of the body, and the second filling valves and discharge valves for water are located at a first end of the body opposite the second end.

10. The apparatus according to claim 8, further comprising upper pipes for water filling and air discharging, and lower pipes for air filling and water discharging installed through one or more separation walls separating the soft and hard compartments and the valve compartments in order to allow water and air to run into all the floating soft and hard compartments and valve compartments, the upper pipes and lower pipes being equipped with a back-pressure valve to allow the water or air to flow only one direction when filling and another direction when discharging.

11. The apparatus according to claim 9, the apparatus further comprising collecting means in the body for collecting the energy recovered by the recovery units; and a cable for delivering the energy recovered by the recovery units for further use; and the body has a cable trough equipped with a protective cover for joining all the recovery units of the apparatus module at least into the collecting means.

12. The apparatus according to claim 10, where the apparatus module is fitted to be descended into its production site in the intermediate water area of the water basin at the depth where the relation of the water depth to the principally prevailing wavelengths is between 1/2-1/20, and where the recovery units of the kinetic energy have wing elements that are arranged to make reciprocating motion caused by the kinetic energy of the waves for recovering the kinetic energy in the intermediate water area of the water basin.

13. The apparatus according to claim 11, where the body, being made substantially of concrete, is assembled of prefabricated cavity slabs or made by casting.

14. The apparatus according to claim 12, where the number of recovery units attached onto the body is from 2 to 6, advantageously from 3 to 4.

15. The apparatus according to claim 13, the apparatus further comprising at the second end of the body at least a filling valve and a discharge valve for air at the end of each row of the hard compartments and soft compartments, and at the first end of the body at least a filling valve and a discharge valve for water at the end of each row of the hard compartments and soft compartments.

16. The apparatus according to claim 13, the apparatus further comprising at least an internal filling valve for water between the first soft compartments and the first hard compartments at the first end of the apparatus module, and an internal filling valve for air between the first soft compartments and the first hard compartments at the second end of the apparatus module, the internal filling valve for water being a pressure sensitive valve arranged to open automatically when a water pressure in the soft compartments exceeds a predefined limit, and the internal filling valve for gas being a pressure sensitive valve arranged to open automatically when a gas pressure in the soft compartments exceeds a predefined limit, or the internal filling valves being manually operated either directly or with a remote control.

* * * * *